United States Patent
Wang et al.

(10) Patent No.: US 8,453,431 B2
(45) Date of Patent: Jun. 4, 2013

(54) ENGINE-OUT NOX VIRTUAL SENSOR FOR AN INTERNAL COMBUSTION ENGINE

(75) Inventors: Yue-Yun Wang, Troy, MI (US); Yongsheng He, Sterling Heights, MI (US); David B. Brown, Brighton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 636 days.

(21) Appl. No.: 12/715,444

(22) Filed: Mar. 2, 2010

(65) Prior Publication Data

US 2011/0214650 A1 Sep. 8, 2011

(51) Int. Cl.
*F01N 3/00* (2006.01)

(52) U.S. Cl.
USPC ............ 60/285; 60/274; 60/286; 60/297; 60/301; 701/103; 701/106; 701/109

(58) Field of Classification Search
USPC ............ 60/274, 276, 277, 285, 297, 301, 60/286; 701/102, 103, 106, 109, 115
See application file for complete search history.

(56) References Cited

U.S. PATENT DOCUMENTS

| | | | |
|---|---|---|---|
| 6,882,929 B2 * | 4/2005 | Liang et al. | 701/115 |
| 7,117,078 B1 | 10/2006 | Gangopadhyay | |
| 7,150,144 B2 * | 12/2006 | Nakagawa et al. | 60/277 |
| 7,383,118 B2 * | 6/2008 | Imai et al. | 701/104 |
| 7,438,061 B2 | 10/2008 | Wang et al. | |
| 7,778,766 B1 * | 8/2010 | Cowgill et al. | 701/108 |
| 7,997,070 B2 * | 8/2011 | Yasui et al. | 60/295 |
| 8,001,767 B2 * | 8/2011 | Kakuya et al. | 60/285 |
| 2010/0083640 A1 | 4/2010 | Wang et al. | |

FOREIGN PATENT DOCUMENTS

| | | |
|---|---|---|
| DE | 102007061468 A1 | 10/2008 |
| DE | 102009028873 A1 | 3/2011 |
| WO | 2008131789 A1 | 6/2008 |

OTHER PUBLICATIONS

U.S. Appl. No. 12/576,399, Wang et al.
Del Re, L. et al., "NOx Virtual Sensor Based on Structure Identification and Global Optimization," SAE Paper 2005-01-0050, 2005.
Lyons, C.M. et al., "Sensitivity of a Dl Diesel NOx Model to Changes in Common Rail Pressure, Injection Patterns, and EGR," SAE Paper 2005-01-2118, 2005.
Andersson, M. et al., "A Real Time NOx Model for Conventional and Partially Premixed Diesel Combustion," SAE Paper 2006-01-1095, 2006.
Ericson, C. et al., "Modeling Diesel Engine Combustion and NOx Formation for Model-based Control and Simulation of Engine and Exhaust Aftertreatment Systems," SAE Paper 2006-01-0687, 2006.
Arsie, I. et al., "Multi-Zone Predictive Modeling of Common Rail Mutli-Injection Diesel Engines," SAE Paper 2006-01-1384, 2006.
Arregle, J. et al., "Sensitivity Study of a NOx Estimation Model for On-Board Applications," SAE Paper 2008-01-0640, 2008.
Chew, V.C., Sensor Validation Scheme with Virtual NOx Sensing for Heavy Duty Diesel Engines, Master's Thesis, West Virginia University, Morgantown, WV, 2007.

* cited by examiner

*Primary Examiner* — Binh Q Tran

(57) ABSTRACT

A method for controlling an internal combustion engine includes monitoring engine operation including a parameter descriptive of NOx generation within the engine, determining a fast transient NOx estimate with a dynamic model based upon the monitored engine operation, and during a fast transient engine operation including an increase in an operating state of the engine and a substantial closing of an exhaust gas recirculation valve, controlling an engine system based upon the fast transient NOx estimate.

18 Claims, 11 Drawing Sheets

ENGINE-OUT NOX VIRTUAL SENSOR FOR AN INTERNAL COMBUSTION ENGINE

TECHNICAL FIELD

This disclosure is related to control of aftertreatment of NOx emissions in internal combustion engines.

BACKGROUND

The statements in this section merely provide background information related to the present disclosure and may not constitute prior art.

Oxides of nitrogen, NOx, are known by-products of combustion. NOx is created by nitrogen and oxygen molecules present in engine intake air disassociating in the high temperatures of combustion, and rates of NOx creation include known relationships to the combustion process, for example, with higher rates of NOx creation being associated with higher combustion temperatures and longer exposure of air molecules to the higher temperatures. Reduction of NOx created during the combustion process are priorities in engine design and engine and exhaust aftertreatment control systems.

NOx molecules, once created in the combustion chamber, can be converted back into nitrogen and oxygen molecules in devices known in the art within the broader category of aftertreatment devices. However, one having ordinary skill in the art will appreciate that aftertreatment devices are largely dependent upon operating conditions, such as device operating temperature driven by exhaust gas flow temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies, since aftertreatment devices frequently require an elevated operating temperature, driven by the exhaust gas flow temperature, to operate adequately to treat NOx emissions.

Aftertreatment devices are known, for instance, utilizing catalysts capable of storing some amount of NOx, and engine control technologies have been developed to combine these NOx traps or NOx adsorbers with fuel efficient engine control strategies to improve fuel efficiency and still achieve acceptable levels of NOx emissions. One exemplary strategy includes using a NOx trap to store NOx emissions during fuel lean operations and then purging the stored NOx during fuel rich, higher temperature engine operating conditions. Such purging events or regeneration events can be the result of changing vehicle operation or forced purging events. A forced purging event requires monitoring the amount of NOx stored and some mechanism or criteria to initiate the purge. For example, a NOx trap has a limited storage capacity, and sensors can be used in the exhaust gas flow to estimate NOx generation in order to estimate the NOx trap state. Once the NOx trap gets close to its full capacity, it must be regenerated with a fuel rich reducing "pulse." It is desirable to control the efficiency of the regeneration event of the NOx trap to provide optimum emission control and minimum fuel consumption. Various strategies have been proposed.

Techniques are known for adsorbing NOx (trapping) when the air-fuel ratio of the exhaust gas flowing into the NOx adsorbent is lean and releasing the adsorbed NOx (regenerating) when the air-fuel ratio of the exhaust gas flowing into the NOx adsorbent becomes rich wherein the amount of NOx adsorbed in the NOx adsorbent may be estimated from the engine load and the engine rotational speed. When the amount of the estimated NOx becomes the maximum NOx adsorption capacity of the NOx adsorbent, the air-fuel ratio of the exhaust gas flowing into the NOx adsorbent is made rich. Determination of a regeneration phase may also be on the basis of individual operating cycles of the internal combustion engine.

It is also known to estimate how full the NOx trap is by estimating the amount of NOx flowing into the NOx trap using a NOx sensor or a pre-NOx trap oxygen sensor. It is also known to schedule regeneration based on estimations of accumulated NOx mass and engine load and speed operating condition probabilities. Increasingly stringent emission standards require NOx aftertreatment methods, utilizing, for example, a selective catalytic reduction device (SCR). An SCR utilizes ammonia derived from urea injection or recovered from normal operation of a three-way catalyst device to treat NOx. Continued improvement in exhaust aftertreatment requires accurate information regarding NOx emissions in the exhaust gas flow in order to achieve effective NOx reduction, such as dosing proper amount of urea based on monitored NOx emissions.

A NOx sensor or an oxygen sensor add cost and weight to a vehicle, and such sensors frequently require a particular operating temperature range, achieved after some warm-up time, to be functional. There exist methods to estimate engine-out NOx via detailed combustion modeling using heat release model, multi-zone combustion model and Zodovich chemical kinetic equations. This detailed modeling, although good for analysis, may not be appropriate for in-vehicle engine control module (ECM) applications because of complicated programming and calibration requirements. Additionally, such models are sensitive to sensor tolerance and aging, pose a large computational burden upon the ECM, require processing time not providing results in real-time, and do not compensate for dynamic engine conditions and transient system events affecting NOx generation.

SUMMARY

A method for controlling an internal combustion engine includes monitoring engine operation including a parameter descriptive of NOx generation within the engine, determining a fast transient NOx estimate with a dynamic model based upon the monitored engine operation, and during a fast transient engine operation including an increase in an operating state of the engine and a substantial closing of an exhaust gas recirculation valve, controlling an engine system based upon the fast transient NOx estimate.

BRIEF DESCRIPTION OF THE DRAWINGS

One or more embodiments will now be described, by way of example, with reference to the accompanying drawings, in which.

DETAILED DESCRIPTION

Figure 1:
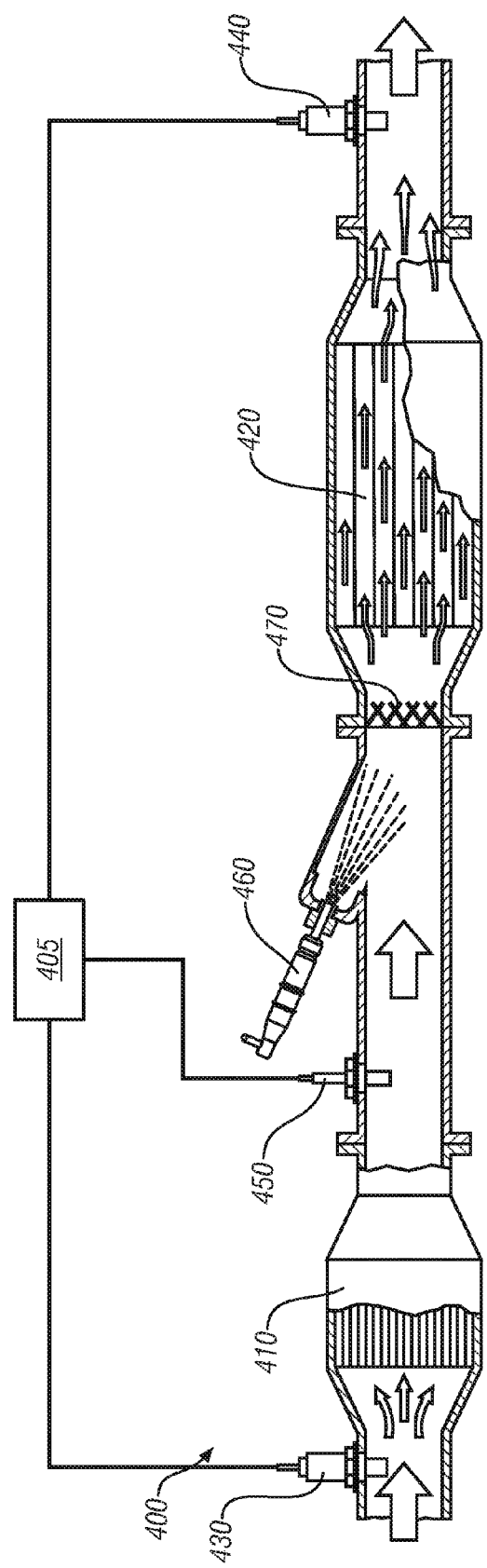
FIG. 1 schematically illustrates an exemplary aftertreatment system including a dosing module for what device, in accordance with the present disclosure.

Referring now to the drawings, wherein the showings are for the purpose of illustrating certain exemplary embodiments only and not for the purpose of limiting the same, FIG. 1 schematically illustrates an exemplary aftertreatment system of an engine including a urea dosing configuration, in accordance with the present disclosure. Aftertreatment system 400 comprises a control module 405, diesel oxidation catalyst (DOC) 410, selective catalytic reduction (SCR) device 420, upstream NOx sensor 430, downstream NOx sensor 440, temperature sensor 450, and urea dosing module 460. DOC 410 performs a number of catalytic functions necessary to aftertreatment of an exhaust gas flow in a diesel engine configuration. One having ordinary skill in the art will appreciate that a three-way catalyst can be used in place of a DOC 410 in an equivalent gasoline engine configuration. SCR 420 utilizes urea as a reactant to reduce NOx into other molecules. Upstream NOx sensor 430 detects and quantifies NOx in the exhaust gas flow entering aftertreatment system 400. As will be discussed herein, understanding the amount of NOx present in the exhaust gas flow that must be treated is important to controlling the aftertreatment system. Temperature sensor 450 is depicted, located in a region to gather exhaust gas flow temperatures within the aftertreatment system 400. Downstream NOx sensor 440 detects and quantifies NOx in the exhaust gas flow exiting aftertreatment system 400. Control module 405 includes programming required to process inputs related to the aftertreatment system and can include programming to employ methods described herein. Aftertreatment system 400 can additionally include a lean NOx trap to store NOx and periodically be purged or regenerated to convert the stored NOx.

SCR 420 utilizes ammonia, for example, as derived from injected urea, to convert NOx to other molecules. An alternative SCR device configuration utilizes hydrocarbons as a reductant in the place of ammonia. Urea dosing module 460 is depicted in a position upstream of SCR 420. The urea can be directly sprayed into the exhaust gas flow entering the SCR. However, a preferred method is depicted, utilizing a mixer device 470. Urea dosing module 460 injects urea onto mixer device 470, and the urea is then carried by the exhaust gas flow in a substantially even distribution onto the catalyst surfaces on the interior of SCR 420.

The signal from NOx sensor 430 can be used to control the aftertreatment system, for example, by describing a NOx content within the exhaust gas flow that must be treated by the aftertreatment devices. Such a signal, for example, can be utilized to accurately dose urea upon SCR 420 or control periodic regeneration of a lean NOx trap.

As described above, the exemplary configuration described in FIG. 1 includes an aftertreatment system of a diesel engine. However it will be appreciated that the methods described herein can be applied to many internal combustion engine configurations including gasoline engine configurations.

Figure 2:
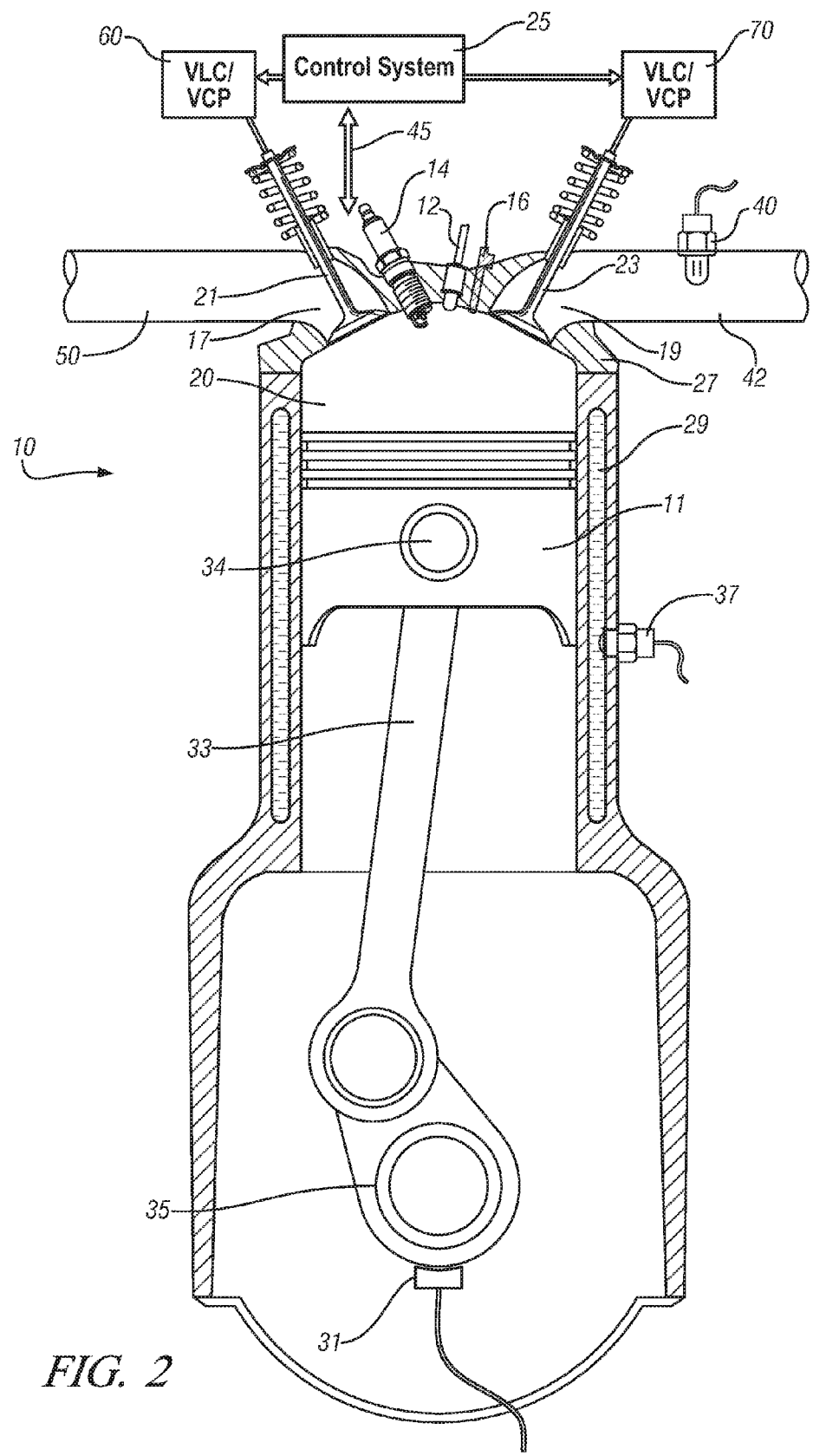
FIG. 2 is a schematic drawing of an exemplary engine system, in accordance with the present disclosure.

FIG. 2 schematically depicts an exemplary internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge compression-ignition or HCCI mode. A similar mode can be described in diesel engines as premixed controlled compression ignition or PCCI mode.

A naturally aspirated, a four-stroke, single cylinder, 0.55 liter, controlled auto-ignition, gasoline direct injection fueled internal combustion engine having a compression ratio of substantially 12 to 13 was utilized in implementing the valve and fueling controls and acquisition of the various data embodied herein. Unless specifically discussed otherwise, all such implementations and acquisitions are assumed to be carried out under standard conditions as understood by one having ordinary skill in the art.

The exemplary engine 10 includes a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine. The engine preferably includes known systems including an external exhaust gas recirculation (EGR) valve and an intake air throttle valve.

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the control system 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control (VLC) and variable cam phasing (VCP). The VCP device is operative to control timing of opening or closing of each intake valve and each exhaust valve relative to rotational position of the crankshaft and opens each valve for a fixed crank angle duration. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device. Exhaust gas passes from the exhaust port 19 to an exhaust manifold 42, which includes exhaust gas sensors 40 operative to monitor constituents of the exhaust gas flow, and determine parameters associated therewith. Exhaust manifold 42 is communicably connected to an aftertreatment system, for example, gasoline equivalent of exemplary aftertreatment system 400. The exhaust gas sensors 40 can comprise any of several known sensing devices operative to provide parametric values for the exhaust gas flow, including air/fuel ratio, or measurement of exhaust gas constituents, e.g. NOx, CO, HC, $O_2$, particulate matter (PM), and others and can include upstream NOx sensor 430, described above. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network (LAN) bus which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include: engine temperature, as indexed by methods such as monitoring engine coolant temperature, oil temperature, or metal temperature; crankshaft rotational speed (RPM) and position; manifold absolute pressure; ambient air flow and temperature; and ambient air pressure. Combustion performance measurements typically comprise measured and inferred combustion parameters, including air/fuel ratio, location of peak combustion pressure, among others.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve, and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g. during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

Control system, control module, module, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

As described above, an upstream NOx sensor 430 can be utilized to measure NOx content in an exhaust gas flow. However, sensors can be costly and add weight to the vehicle, and a method to estimate engine out NOx without the use of such a sensor would be beneficial. Alternatively, a method to estimate engine out NOx without the use of a NOx sensor could be used to check an existing NOx sensor for malfunctions. A method is disclosed modeling engine output and conditions within the exhaust gas flow to estimate the presence of engine out NOx or NOx entering the aftertreatment system. The methods disclosed herein can be applied to multiple engine configurations and multiple aftertreatment configurations and is not intended to be limited to the particular exemplary embodiments described herein. Estimating NOx emission generation can include monitoring engine operation at steady state or controlled or slow transient conditions including identified parameters descriptive of the combustion process and estimating NOx generation in the steady state or slow transient conditions based upon the monitored engine operation. However, fast or more extreme transient engine operation can include conditions within the engine that can create difficulties in estimating NOx with a method configured for steady state or slow transient operation. Reference to steady state engine operation is understood to include slow transient engine operation that is not fast transient engine operation. Estimations may be described as steady state NOx estimations or transient NOx estimations, but it will be appreciated that steady state NOx estimations correspond to engine steady state engine operation or slow transient engine operation and that the transient NOx estimations correspond to fast transient engine operation. Parameters descriptive of engine out NOx at steady state can be different from parameters descriptive of engine out NOx in fast transient conditions. For example, estimates of NOx generation during a tip-in maneuver, wherein the output of the engine is rapidly increased, made by a steady state determination can differ greatly from actual NOx generation. One exemplary source of such error can include closing of the EGR valve during the transient. Such a closing of the EGR valve rapidly changes inflows into the intake manifold. As a result, a rapid increase or spike in intake air mass can be observed coinciding with the closure of the EGR valve. For this reason or as an independent indicator of rapid changes to the engine, rapid changes to intake air mass to the engine can be monitored to indicate a fast transient engine condition. An estimated transient NOx for use in controlling systems in a vehicle can be determined as a stand-alone value, estimating an effect of the transition, or such an estimate can be utilized, for example, in conjunction with a steady state NOx estimate to estimate total NOx generation during transient engine conditions.

As described herein below, NOx emission estimation utilizes a variety of engine sensor outputs and engine control settings to quantify parameters descriptive of the combustion process. By estimating the state of the combustion process for the combustion chamber 16, factors affecting NOx generation through the combustion process can be determined and made available for use in NOx generation estimation.

Figure 3:
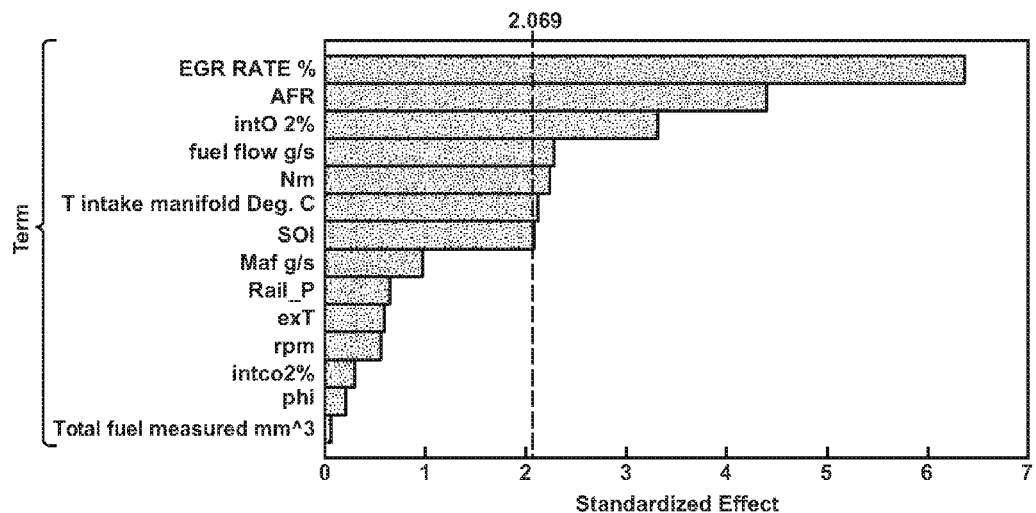
FIG. 3 is a graphical depiction of exemplary modeled results describing standardized effects of a number of parameters descriptive of the combustion process affecting NOx emission production under a given set of steady state engine mapping conditions, in accordance with the present disclosure.

A steady state NOx estimate is determined based upon parameters descriptive of the combustion process. Selection of parameters descriptive of NOx generation within an engine operating range can be useful to accurately estimate steady state NOx generation in the engine. FIG. 3 is a graphical depiction of exemplary modeled results describing standardized effects of a number of parameters descriptive of the combustion process affecting NOx emission production under steady state engine mapping operating conditions, in accordance with the present disclosure. By studying such models under various engine operating conditions, a method can be provided with a predetermined number of parameters descriptive of the combustion process that most affect NOx generation. As will be appreciated by one having ordinary skill in the art, equations and model predictions of parameters descriptive of the combustion process frequently operate most effectively when the engine 10 is operating at or near steady state or at a controlled, slow engine acceleration. The exemplary pareto chart of FIG. 3 shows the effects of engine parameters on the NOx output with statistically 95% confidence, contribution effect from parameters falling below 2.069 is considered noise. Therefore, parameters descriptive of the combustion process corresponding to minimal transitory engine sensor inputs are preferably selected for input into the neural network as described herein below.

FIG. 3 shows a number of parameters have varying effects on NOx generation. The parameters are selected based upon testing or modeling of a particular engine configuration. For example, in one embodiment a combustion pressure sensor is excluded from the engine 10 thereby prohibiting use of identifiable factors determined based upon pressure sensor measurements. In one embodiment, testing or modeling shows EGR % has the largest impact upon NOx generation for the engine modeled. In this instance, recirculating a particular amount of exhaust gas back into the combustion chamber through the EGR valve 38 lowers the adiabatic flame temperature of the combustion process, thereby lowering the temperatures that nitrogen and oxygen molecules are exposed to during combustion and, thereby, lowering the rate of NOx generation. In one exemplary embodiment, as depicted in FIG. 3, seven parameters descriptive of the combustion process are selected for input into the NOx estimation model, listed in order of the significance of model predicted effect upon NOx generation, including EGR %, an air fuel ratio (AFR), an intake air oxygen percentage, a fuel flow rate, an engine output torque, an intake manifold temperature, and a start of fuel injection timing. It will be appreciated that different engine parameters can indicate similar effects. For example, EGR % and intake O2% allow estimation of similar effects within the combustion chamber. Similarly, engine torque and fuel flow rate allow estimation of similar effects within the combustion chamber. As a result, the selected parameters can be reduced to five parameters descriptive of the combustion input into the steady state NOx estimation model. Those include EGR %, AFR, a fuel flow rate, a start of injection timing (SOI), and an intake manifold temperature. Selection of the particular parameters useful for estimating NOx generation can be estimated based upon modeling or testing of the exemplary engine under specific conditions.

Figure 4:
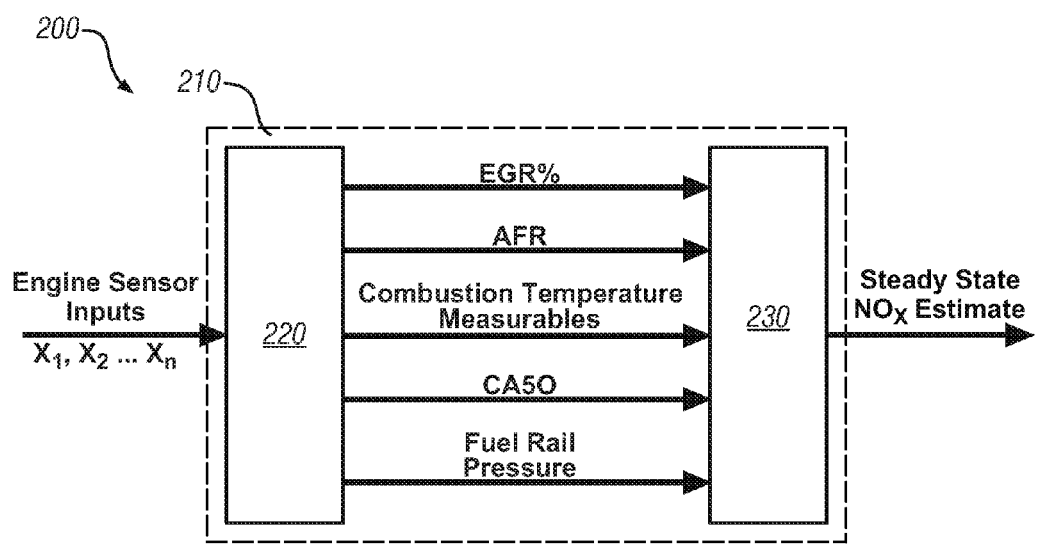
FIG. 4 depicts operation of an exemplary steady state NOx estimation, in accordance with the present disclosure.

Once a set of parameters descriptive of NOx generation in an engine based on steady state conditions is selected, these parameters can be utilized in NOx estimation. Operation of an exemplary steady state or slow transient NOx estimation is depicted in FIG. 4. Configuration 200 is depicted. Steady state NOx estimation module 210 is depicted including a physics model module 220 and estimation module 230. Engine sensor inputs including or necessary to determine the set of parameters selected as described above are input as values $x_1, x_2 \ldots x_n$. Physics model module 220 determines from the sensor inputs values of the set of parameters necessary for the NOx estimation. Estimation module 230 inputs the set of parameters and outputs a NOx estimate. It is noted that CA50, a measure of crank angle at which combustion has progressed 50%, is included in the depicted model. According to one embodiment, CA50 is determined according to data from in-cylinder pressure sensors. However, it will be appreciated that the methods described herein can be operated with or without in-cylinder pressure sensors.

Estimation module 230 can utilize a number of different methods to estimate steady state NOx. For example, estimation module 230 can utilize an artificial neural network. Artificial neural networks or neural networks are computer systems created for complex and adaptable decision making. Whereas traditional computing means are based upon sequential processing of data through an algorithm yielding predictable results, neural networks are known to process data in consecutive layers and parallel paths within each layer through alternate nodes. The neural network is initially trained with data yielding a known set of results. As a result of this training, weights are applied between the layers and among the nodes, the network automatically adapting to the training data and adjusting the weights to more closely model the data. In later use, the neural network can retain the training adjustments and apply them through the life of the network, or the network can employ various known methods to learn from ongoing data patterns. Neural networks have the benefit of being adaptive to complex data sets and changing conditions and can be used in situations where not all of the factors or relationships in the data are known at the time of the production of the network. An additional benefit of this data-based analysis method is that the neural network depends less upon actual sensor inputs than upon trends in the data.

Figure 5A:
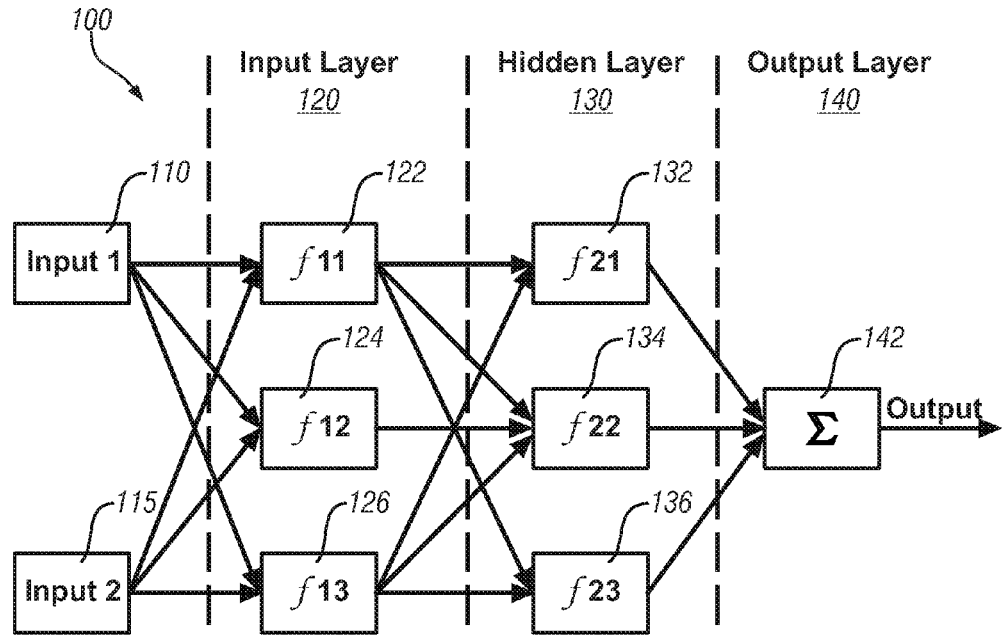
FIG. 5A depicts information flow through an exemplary artificial neural network, in accordance with the present disclosure.

FIG. 5A depicts information flow through an exemplary artificial neural network or neural network in accordance with the present disclosure. Neural networks are known to process data in consecutive layers and parallel paths within each layer through alternate nodes. Exemplary neural network 100 includes inputs 110 and 115 and three layers, including an input layer 120, a hidden layer 130, and an output layer 140. Input layer 120 includes three nodes, nodes 122, 124, and 126. Hidden layer 130 includes three nodes, nodes 132, 134, and 136. Output layer 140 includes one node, node 142. Each of the nodes in each layer provides alternate functional relationships and operations that can be performed upon information being fed to the layer. Effects of each node upon the output of that layer are adjusted by weights, and these weights are adaptable to correct the overall output of the neural network. Weights affecting the influence of each node are developed by initially training the neural network with data yielding a known set of results and adjusting weights to make the output of the neural network match the known results. Either solely as a result of this initial training or as a result of this initial training plus an adaptation factor learned through ongoing use of the neural network, weights are applied between the layers and among the nodes. By training and tuning a neural network, input data with varying factors and unknown dependencies can be analyzed to generate an estimated output.

Figure 5B:
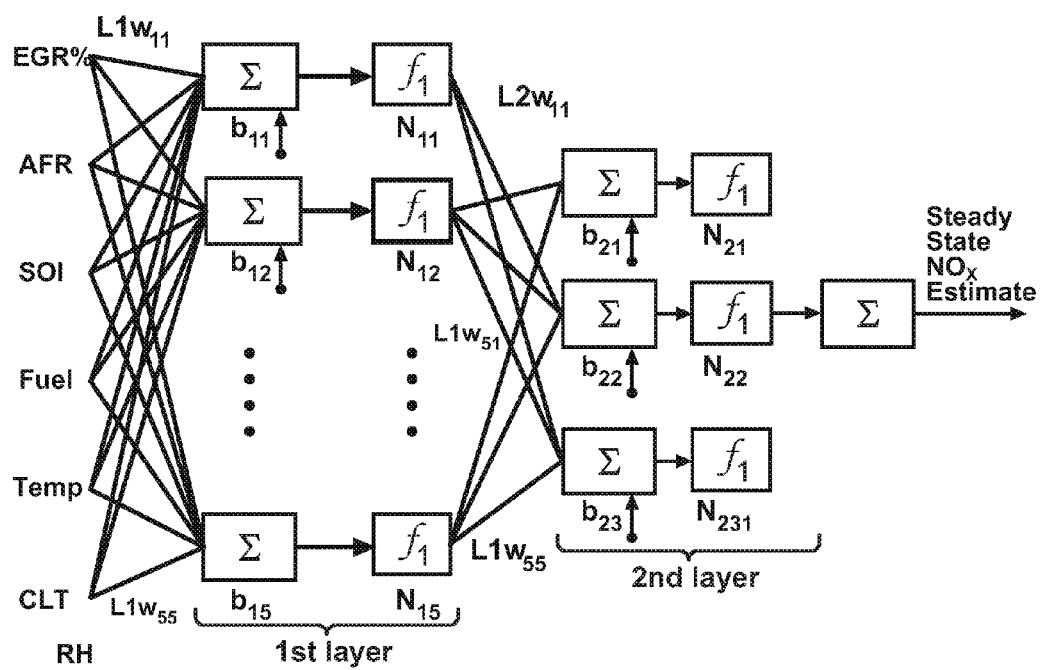
FIG. 5B depicts information flow through an exemplary artificial neural network configured to generate a steady state NOx estimate, in accordance with the present disclosure.

FIG. 5B depicts information flow through an exemplary artificial neural network configured to generate a steady state NOx estimate, in accordance with the present disclosure. FIG. 5B includes inputs, selected by methods described above, and applied to an exemplary neural network in order to produce a steady state NOx estimate output. The exemplary neural network, as described above, includes an input or "first" layer and a hidden or "second" layer, producing an output. The exemplary inputs utilized in the estimate include EGR %, AFR, SOI, fuel rate, an intake manifold temperature (Temp), a coolant temperature (CLT), and a relative humidity (RH). It will be appreciated that the neural network as depicted is exemplary, and the disclosure is not intended to be limited to the particular exemplary embodiments described herein. Further, it will be appreciated that other mathematical operations can be utilized to determine a steady state NOx estimate based upon an identified number of inputs known to impact NOx generation, and the disclosure is not intended to be limited to the particular exemplary embodiments described herein.

Another method envisioned to determine a steady state NOx estimate, for example, includes a nonlinear regression model. Such a method can be utilized, modeling the steady state response according to the following exemplary equation:

$$y = f(x_1, x_2 \ldots x_n) \quad [1]$$

wherein $x_1, x_2 \ldots x_n$ describe the selected parameters descriptive of steady state NOx generation.

Steady state NOx emission estimates can be generated based upon the parameters descriptive of the combustion process. However, as described above, engine out NOx can change and become unpredictable according to a steady state model when the engine is operating in a fast or extreme transient condition, wherein engine parameters such as intake air mass and EGR % can change rapidly.

Transient NOx emission production in the engine 10 may positively or negatively contribute to total engine-out NOx emission production. Transient NOx can be estimated through a dynamic model inputting parameters descriptive of transient NOx generation. In one exemplary embodiment, a transient NOx estimate can be calculated as a change from the quasi steady state NOx estimate at current conditions, with the sum of the quasi steady state and transient terms equaling a total engine out NOx estimate. The total engine out NOx estimate may then be calculated according to the following expression:

$$NOx = f(x_1, x_2, \ldots x_n) + g(e_1, e_2, \ldots e_n, t) \quad [2]$$

wherein f(x) represents quasi steady state NOx emission production, g(e) represents transient NOx emission production, and t represents elapsed time between estimates. As described above, x represents parameters descriptive of steady state NOx generation. The terms e describe parameters descriptive of transient NOx generation. Such a relationship can be represented by the response of the following ordinary differential equation:

$$\dot{x} = ax + u \quad [3]$$

$$y = x \quad [4]$$

with the solution as follows.

$$y = \frac{1}{a}u - \frac{1}{a}e^{at}u \quad [5]$$

It will be appreciated that Equation 5 expresses the solution as a steady state term minus a transient term.

Such an ordinary differential equation can be utilized to predict the transient response of engine out NOx to rapid changes in engine operation. Adapting a differential equation to the response of an engine, for example, according to test or calibration results, can be performed according to methods. For example, the above differential equations can be represented by the following:

$$X(k+1) = Ax(k) + Bu(k) \quad [6]$$

$$Y(k) = Cx(k) \quad [7]$$

wherein A, B, and C represent matrices that can be adjusted based upon observed operation of a test engine. Such adjustment is known in the art as state space modeling. By fitting the matrices to the actual test data, the equations approximate operation of the modeled system. Once these adjustments are made, the resulting model can be described as a nonlinear dynamic model in discrete state space.

A fast transient NOx estimation, as is estimated by the operation of Equations 6 and 7 and the related method above, can be represented as a difference or residual between an actual engine out NOx value and an estimated engine out NOx, determined by a steady state or slow transient NOx estimation. A test engine can be monitored through a calibration cycle including fast transient operation, and this monitored operation including data from an engine out NOx sensor can be compared to an engine out NOx estimate made by a steady state or slow transient NOx estimation. The difference can be utilized to determine the behavior of the transient NOx estimate to determine the matrices described above.

Figure 6:
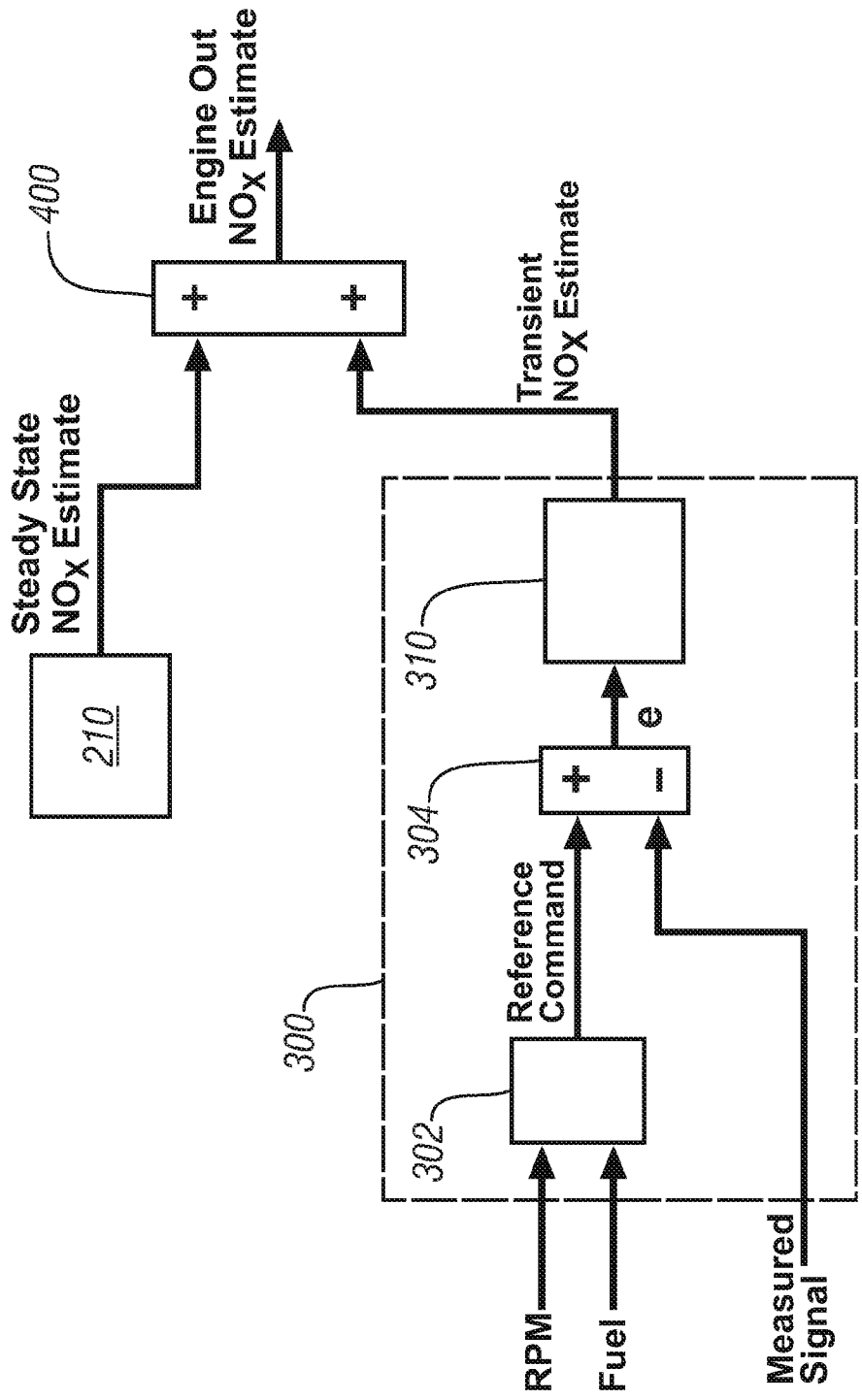
FIG. 6 schematically depicts operation of an exemplary transient NOx estimation, in accordance with the present disclosure.

FIG. 6 schematically depicts operation of an exemplary transient NOx estimation, in accordance with the present disclosure. Transient NOx estimation module 300 is depicted monitoring a selected set of parameters descriptive of NOx generation during transient engine conditions and outputting a transient NOx estimate. As described above, methods are envisioned that can utilized the transient NOx estimate in isolation, for example, describing the net effect of transient engine operation to current operation. In the depicted embodiment, the transient NOx estimate is combined with a steady state NOx estimate generated by steady state NOx estimation module 210, as described above, and the summed term is an engine out NOx estimation, describing a total engine out NOx value.

Figure 7:
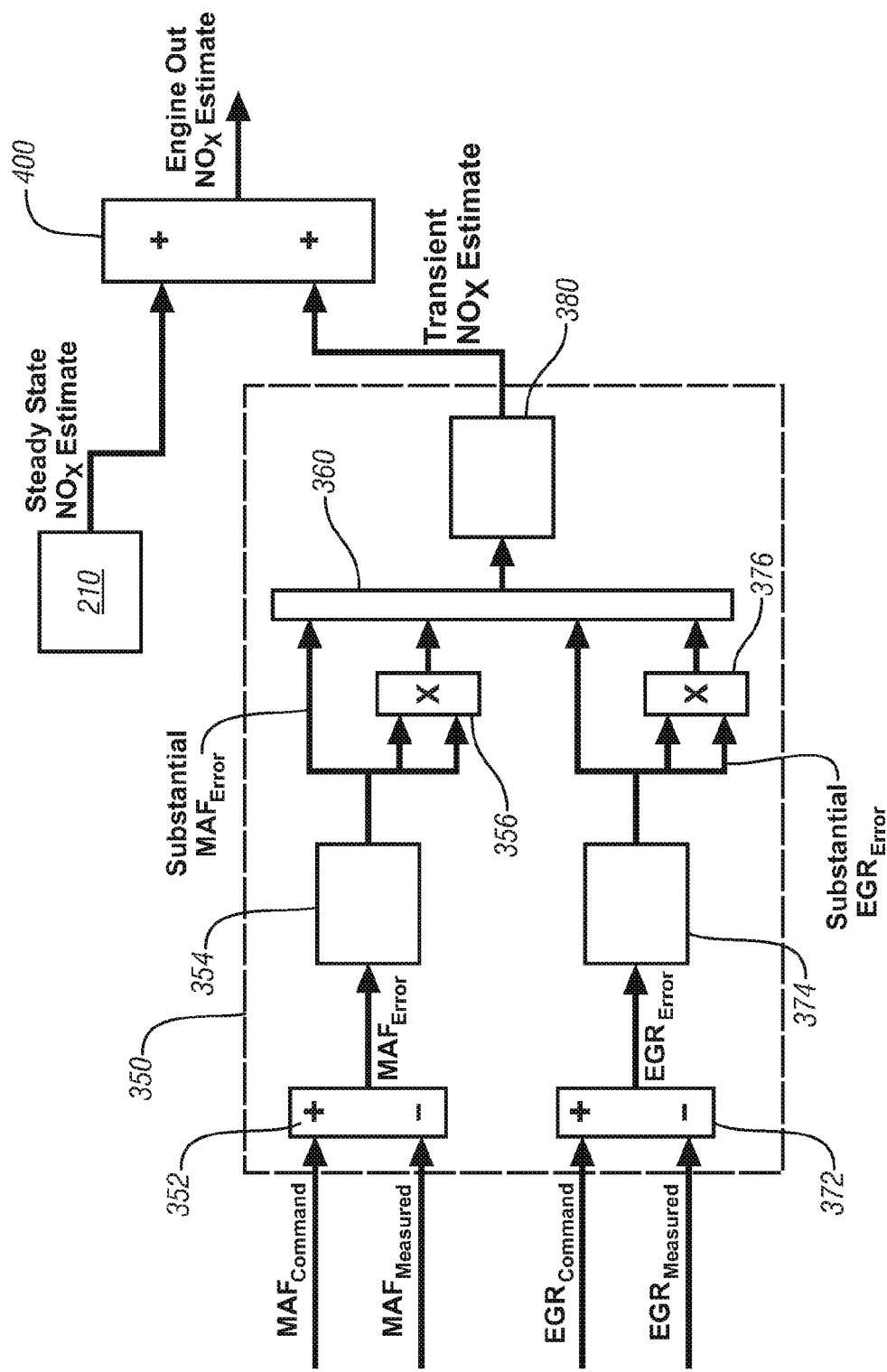
FIG. 7 schematically depicts operation of a transient NOx estimation module utilizing EGR % and intake air mass as parameters descriptive of NOx generation under transient engine conditions, in accordance with the present disclosure.

Exemplary transient NOx estimation module 300 includes reference command module 302, summation module 304, and dynamic model compensation module 310. A term is selected as being predictive of transient NOx generation according to the methods described above. A number of such terms can be selected, but this exemplary embodiment depicts selection of a single term. FIG. 7, described below, illustrates operation of a plurality of terms. Signal estimation module 302 inputs engine sensor readings that are inputs to an exemplary look-up table or other similar device. The output of the table is a reference command, based upon current engine operation, for key engine parameters that control NOx emissions. This reference signal is input to summing block 304 along with the corresponding measured value or measured signal of the term. It will be appreciated that the measured signal is subject to system and sensor lag and other factors that make transient estimation of NOx generation difficult. Summing block 304 outputs the difference or error, e, between the reference signal and the measured signal. This value, e, is descriptive of a transient gap between a measured engine condition and a desired reference condition or trajectory. The value, e, can be used to estimate transient NOx generation and is an input to dynamic model compensation module 310. Dynamic model compensation module employs methods described above, for example, a non-linear dynamic model in discrete state space, and generates the transient NOx estimate based upon e. In this way, transient operation of the engine can be evaluated, and a value estimating the effect of this transient operation upon engine out NOx generation can be determined In this embodiment, summing module 400 inputs the steady state NOx estimated developed in module 210 and the transient NOx estimate and outputs an engine out NOx estimate.

As described above in FIG. 6, the engine out NOx estimate includes the steady state NOx estimate (or steady state or slow transient NOx estimate) and the transient NOx estimate (or fast transient NOx estimate). The fast transient NOx estimate can be determined continuously. Under steady state or slow transient conditions, the fast transient NOx estimate will be small as compared to the steady state or slow transient NOx estimate and will therefore have a small effect on the engine out NOx estimate. In another embodiment, a method can include analysis of the fast transient condition, and the fast transient NOx estimate can be neglected, zeroed, or inactivated based upon determining the fast transient NOx estimate to be insignificant. A fast transient NOx estimate can be determined to be significant or insignificant based upon comparison to a significant fast transient NOx threshold. In one embodiment, as described in more detail below, the fast transient NOx estimate is based upon determining a difference or error between a reference command or an expected command signal of a parameter descriptive of NOx generation and a measured signal of the parameter descriptive of NOx generation. A determination to add or utilize the fast transient NOx estimate can be made based upon an absolute value of the error being greater than a threshold error, indicating that the error describes a significant transient condition or a significant fast transient NOx estimation. Such a significant fast transient NOx threshold or such a threshold error can be determined by any method sufficient to contemplate operation of the engine, treatment of NOx, and the fast transient condition. In one exemplary method, such thresholds can be calibrated based upon substantial closing of the EGR valve. Further, such thresholds can be calibrated based upon a threshold rate of acceleration of the engine, indicating a likely fast transient condition, or a threshold rate of increase of the fuel air ratio of the engine.

Another method to determine a fast transient condition includes monitoring a fuel air ratio. As described above, in response to a rapid increase in engine operating state, for example, as determined by engine speed and engine load, an engine can quickly require an increase in air to operate correctly. In the transition, fuel injection mass can increase more quickly than can intake air mass. As a result, such an increase in engine operating state can be preceded by the fuel air ratio quickly increasing. Engine control methods typically respond to such an increase in engine operating state and the accompanying increase in fuel air ratio by substantially fully closing the EGR valve. By monitoring or estimating the fuel air ratio by methods known in the art, a rapid increase or spike in fuel air ratio can be utilized to determine occurrence of a fast transient condition in which fast transient NOx estimation can be necessary.

As described above, terms must be selected as parameters descriptive of NOx generation under transient engine conditions based upon testing or modeling of the particular engine configuration. However, testing and modeling have shown that EGR % and intake air mass are typically controlling factors in transient NOx generation. Specifically, transient NOx generation has been shown to vary according to an EGR error, describing a difference between an EGR reference command and a measured EGR, the square of EGR error, an intake air mass error, describing a different between an intake air mass reference command and a measured intake air mass, and the square of intake air mass error. As a result, in one exemplary embodiment disclosed herein, EGR % and intake air mass (MAF) are identified as the parameters descriptive of NOx generation under transient engine conditions for a transient NOx estimation module. It will be appreciated that the EGR reference command can be approximated by engine operation, for example, according to an engine speed and a fueling rate. FIG. 7 schematically depicts operation of a transient NOx estimation module utilizing EGR % and intake air mass as parameters descriptive of NOx generation under transient engine conditions, in accordance with the present disclosure. Transient NOx estimation module 350 is depicted as a particular embodiment of transient NOx estimation module 300 above. Transient NOx estimation module 350 comprises summing modules 352 and 372, steady state analysis modules 354 and 374, squaring modules 356 and 376, input module 360, and dynamic model compensation module 380. In the present exemplary embodiment, a commanded value for intake air flow (MAF command) and a commanded value for EGR % (EGR command) are used to describe estimated reference command values for each term. Summing modules 352 and 372 are used to compare MAF command and EGR command, respectively, to a MAF measured term and an EGR measured term. Each summing module outputs an error term. Each error term is input to steady state analysis module 354 and 374, respectively. Steady state analysis modules 354 and 374 examine the respective error term, and if an absolute value of the error term is less than a threshold, the signal is determined to be insignificant, and a zero value is output. Different thresholds selected for each respective term being analyzed can be selected. If the absolute value of the respective error term is above the threshold, then the error is determined to be substantial and is output. As described above, the present embodiment describes transient NOx generation as being sensitive both to intake air mass and EGR % and to the squares of both terms. Squaring modules 356 and 376 receive the respective substantial error terms, and the substantial error terms and the squares of the substantial error terms are inputs to input module 360. Module 360 outputs the various terms to dynamic model compensation module 380, an embodiment of dynamic model compensation module 310 above, and outputs the transient NOx estimate. It will be appreciated that module 380 includes functional relationships estimating the transient behavior of the engine determined based upon the inputs to module 380, for example, by the methods described above in association with Equations 7 and 8 or by other methods. In this embodiment, summing module 400 inputs the steady state NOx estimated developed in module 210 and the transient NOx estimate and outputs an engine out NOx estimate.

The embodiment of FIG. 7 utilizes EGR command or an EGR rate command as an input. According to one embodiment, an EGR rate estimation value, $\dot{m}_{egr}$, describing an EGR flow into the intake manifold, can be accurately estimated in real-time based upon the following equations.

$$\dot{m}_{EGR\%} = 1 - \frac{\dot{m}_A}{\dot{m}_C} = \frac{\dot{m}_{egr}}{\dot{m}_C} \quad [8]$$

$$\dot{m}_{egr} = A \cdot f\left(\frac{P_{im}}{P_{ex}}, T_{ex}\right) \quad [9]$$

$$\dot{m}_C = \frac{P_{im} \cdot \text{rpm} \cdot D \cdot \eta_{VOFF}}{2RT_{im}} \quad [10]$$

$$\eta_{VOFF} = f(\text{rpm}, \rho, P_{ex} / P_{im}) \quad [11]$$

The term $\dot{m}_{EGR\%}$ represents an EGR ratio describing a relationship of EGR rate to $\dot{m}_C$, and can be useful as an input to the exemplary embodiment of FIG. 7. The term $\dot{m}_C$ represents a cylinder charge flow. $P_{im}$ and $P_{ex}$ represent pressures in the intake manifold and exhaust manifold, respectively. $T_{ex}$ represents the temperature in the exhaust manifold. The term rpm represents the engine speed. $\eta_{VOFF}$ represents volumetric efficiency, and $\rho$ represents density of the intake air. The value A represents an effective EGR flow area of the EGR valve, and D is the engine displacement volume. Such a determination, determining $\dot{m}_{EGR\%}$ can be made, for example, in a signal estimation module 302, as described above, either within a transient NOx estimation module or as a separate module conditioning the signal as an input to a transient NOx estimation module.

Figure 8A:
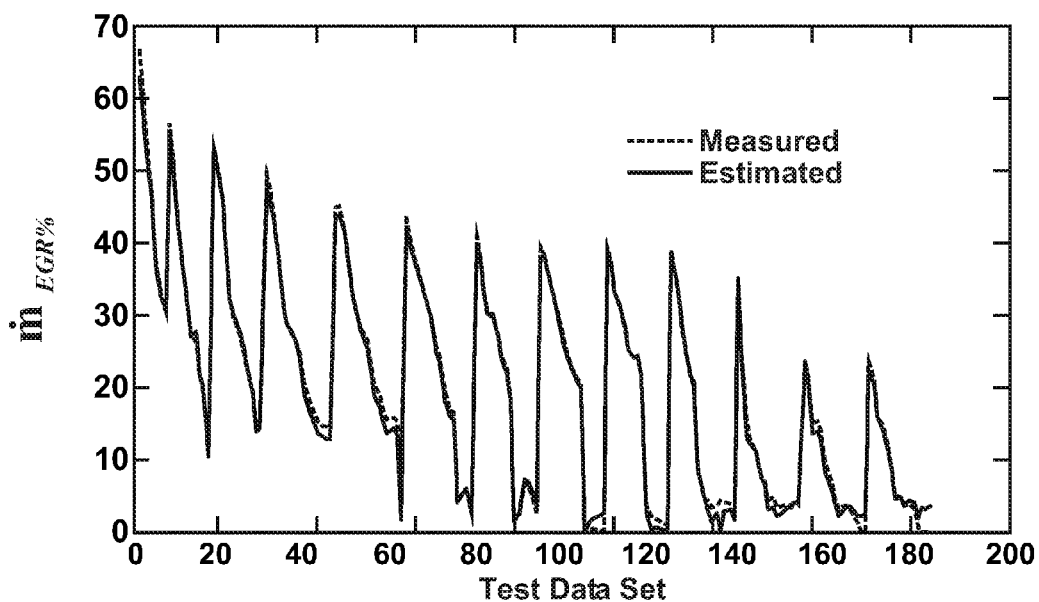
FIGS. 8A-8C depict results and exemplary behavior of the estimation of an EGR rate and volumetric efficiency, in accordance with the present disclosure.
Figure 8B:
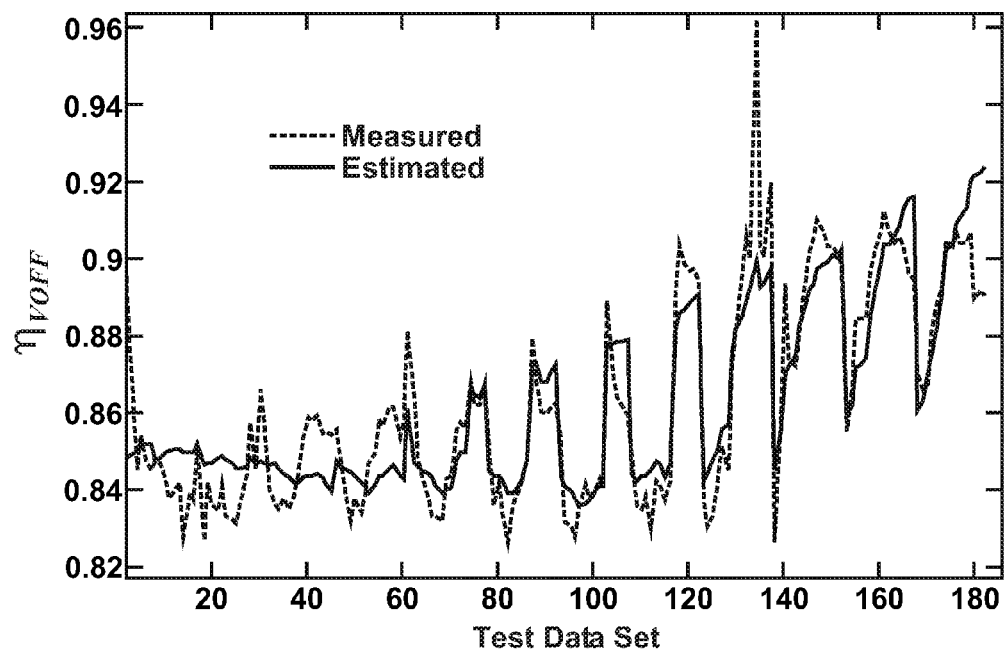
Figure 8C:
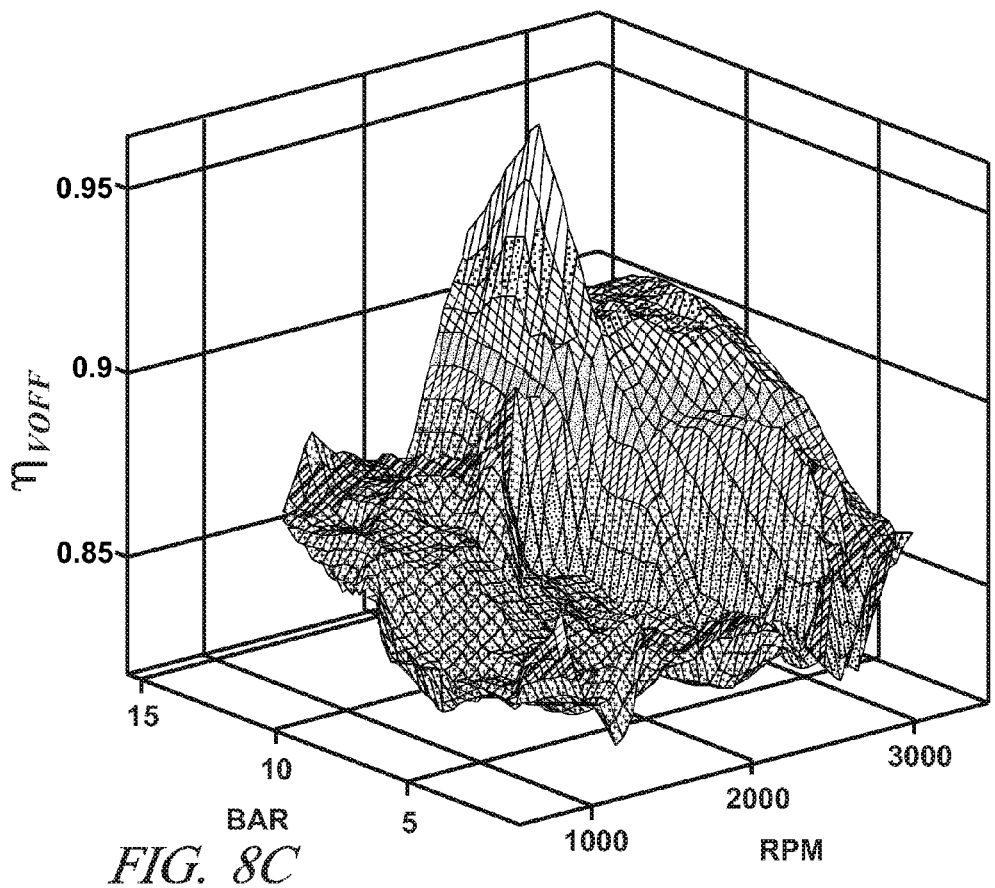

FIGS. 8A-8C depict results and exemplary behavior of the estimation of an EGR rate and volumetric efficiency, in accordance with the present disclosure. FIG. 8A illustrates a comparison between measured and estimated $\dot{m}_{EGR\%}$ values, determined according to the methods described above. Similarly, FIG. 8B illustrates a comparison between measured and estimated $\eta_{VOFF}$ values, determined according to the methods described above. FIG. 8C illustrates a plot of observed behavior in an exemplary engine configuration of $\eta_{VOFF}$ as compared to intake manifold pressure and engine speed. FIGS. 8A-8C, it will be appreciated, depict relationships that can be utilized to generate reference command values, for example, depicted by the output of module 302.

Figure 9:
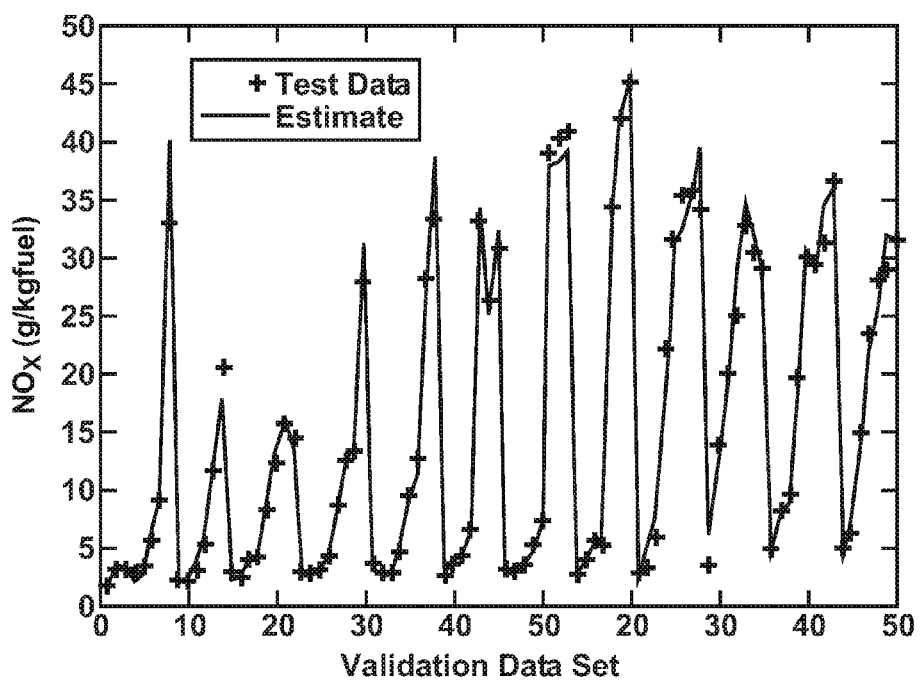
FIG. 9 depicts exemplary estimation results of a steady state NOx estimation, validating training of the steady state NOx estimation, in accordance with the present disclosure.

FIG. 9 depicts exemplary estimation results of a steady state NOx estimation, validating training of the steady state NOx estimation, in accordance with the present disclosure. The plotted points describe measured NOx values from a tested system operating under different steady state conditions. The line plot represents an output estimation of a steady state NOx estimation based upon inputs taken from the tested system. As a review of the data reveals, the steady state NOx estimation adequately determines the NOx output of the system at steady state.

Figure 10:
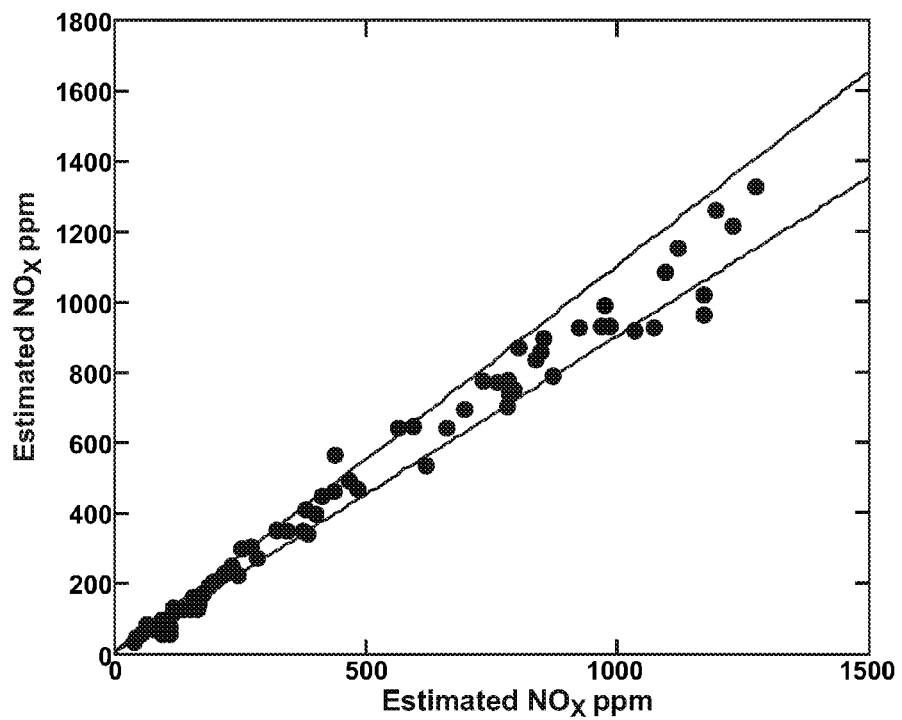
FIG. 10 depicts a validation plot of the results depicted in FIG. 9, in accordance with the present disclosure.

FIG. 10 depicts a validation plot of the results depicted in FIG. 9, in accordance with the present disclosure. Measured and estimated results for a given input condition are plotted, such that perfectly matching results would coincide along a one to one line. Acceptance lines, plotted at 10% variance from the one to one line are depicted. It will be appreciated that the depicted results reveal reasonably acceptable results as judged against a 10% variance threshold.

Figure 11A:
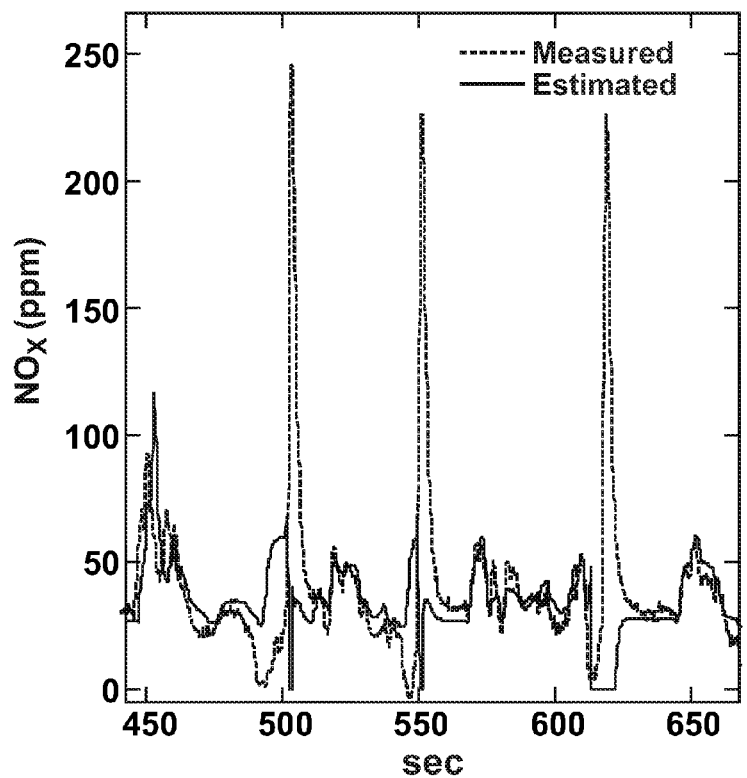
FIGS. 11A-11C depict operation of an engine including transient conditions and corresponding exemplary results of a steady state NOx estimation outputting a NOx estimate, in accordance with the present disclosure.
Figure 11B:
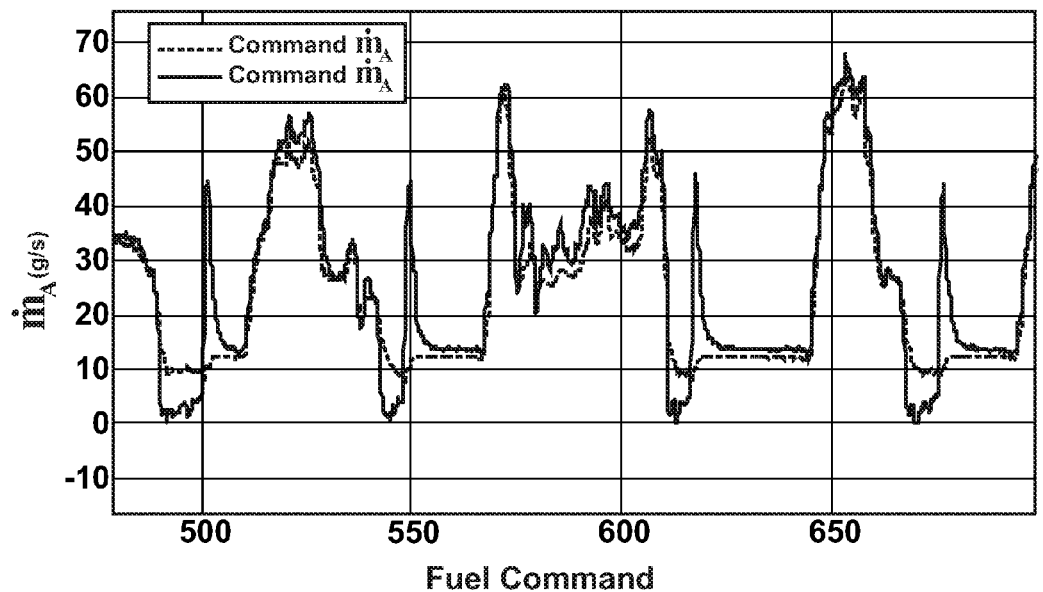
Figure 11C:
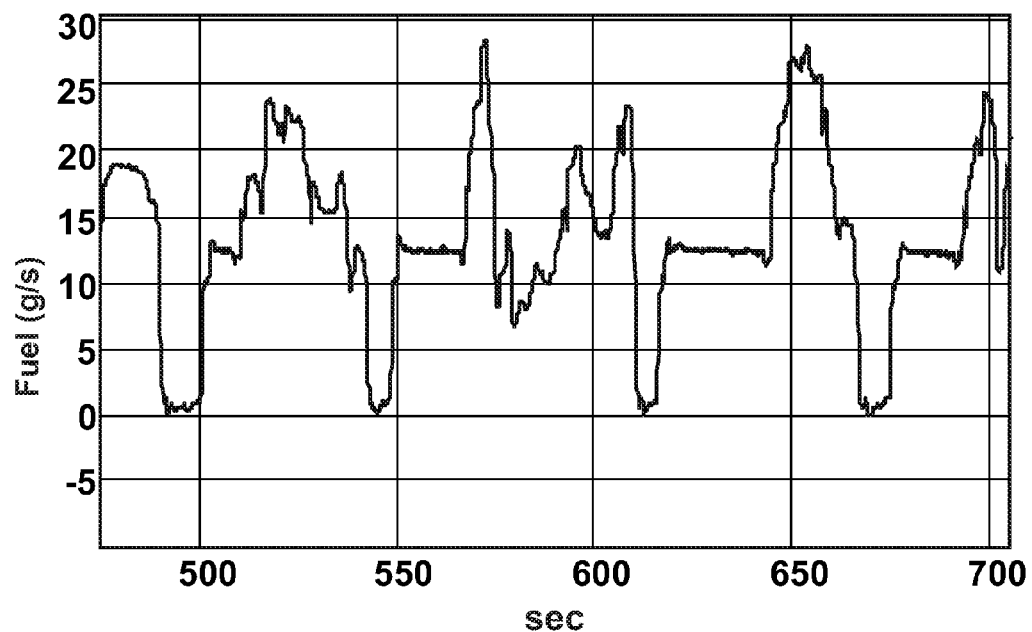

FIGS. 11A-11C depict operation of an engine including transient conditions and corresponding exemplary results of a steady state NOx estimation outputting a NOx estimate, in accordance with the present disclosure. FIG. 11A depicts estimated NOx based upon a steady state NOx estimation model and actual measured NOx output from a NOx sensor during transient engine responses. As revealed by the data, the estimated NOx tracks the measured NOx for much of the test. However, at three distinct points, at approximately 500 seconds, 550 seconds, and 620 second, measured NOx experiences large spikes, whereas the estimated NOx plot does not track these spikes. FIG. 11C depicts a fueling command corresponding to the test results of FIG. 11A. The fueling command reveals a rapid increase in fueling command, such as can be described by a tip-in maneuver, just prior to all three of the spikes in the measured NOx data. As described above, large changes in engine conditions, such as accompany a tip-in maneuver, can result in abrupt changes to EGR % and intake air mass, where an EGR valve is closed during rapid acceleration to avoid heavy smoke. FIG. 11B depicts commanded intake air mass and measured intake air mass corresponding to the test results of FIGS. 11A and 11C. As is revealed by the plots of FIG. 11B, a large disparity between the commanded intake air mass and the actual intake air mass occurs substantially at the times of the spikes described in FIG. 11A. FIGS. 11A-11C illustrate an inability of the depicted steady state NOx estimate to accurately determine NOx at times of corresponding transient engine conditions.

Figure 12:
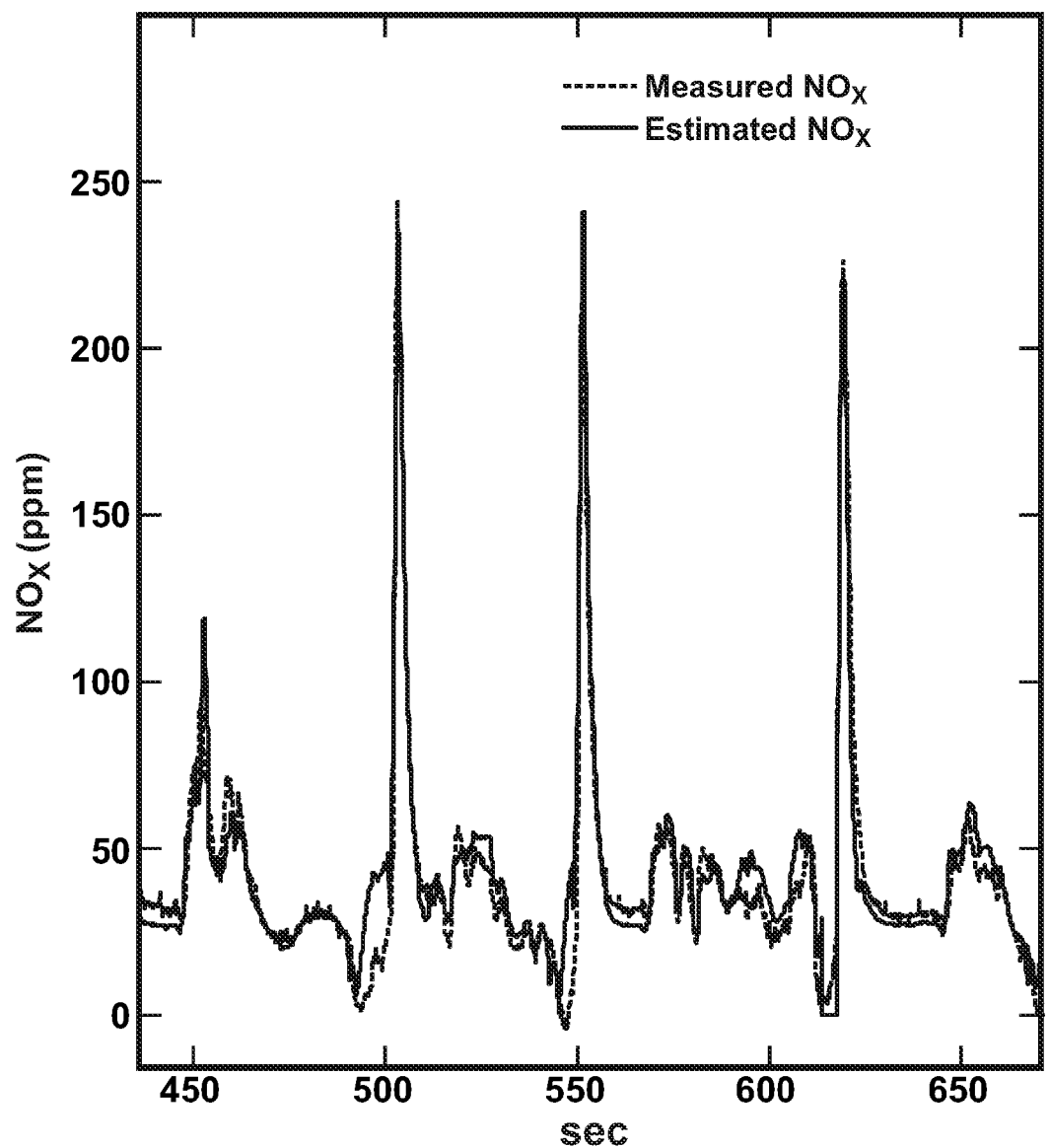
FIG. 12 depicts operation of an engine including transient conditions and corresponding exemplary results of a engine out NOx estimation according to methods described herein, in accordance with the present disclosure.

FIG. 12 depicts operation of an engine including transient conditions and corresponding exemplary results of a engine out NOx estimation according to methods described herein, in accordance with the present disclosure. Estimated NOx and measured NOx are depicted and reveal reasonably acceptable results of estimating NOx generation through the test period, including results tracking spikes in the test data corresponding to large changes in engine conditions.

The above described methods can be utilized to control an exhaust aftertreatment system based upon estimated engine out NOx. Accumulation of NOx in a lean NOx trap can be estimated and even projected based upon expected use of the vehicle, and the timing of regeneration of the NOx trap can be determined Similarly, an amount of dosing of urea or hydrocarbon can be controlled according to the requirements of an SCR device. However, it will be appreciated that the estimated engine out NOx can be utilized in other ways in other systems within the vehicle, for example, by controlling the engine to change the properties of the exhaust gas exiting the engine. For example, during periods wherein conditions within the aftertreatment system are not conducive to effective NOx treatment, the methods described herein can be utilized to track, predict, or otherwise modulate engine operation to reduce NOx generation in the engine. A number of exemplary uses of the disclosed methods are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling an internal combustion engine, the method comprising:
monitoring engine operation comprising a parameter descriptive of NOx generation within the engine;
determining a fast transient NOx estimate with a dynamic model based upon the monitored engine operation; and
during a fast transient engine operation comprising an increase in an operating state of the engine and a substantial closing of an exhaust gas recirculation valve, controlling an engine system based upon the fast transient NOx estimate;
wherein controlling the engine system comprises:
comparing the fast transient NOx estimate to a fast transient NOx threshold calibrated based upon the closing of the exhaust gas recirculation valve and a rate of acceleration of the engine exceeding a threshold rate of acceleration; and
controlling the engine system in the vehicle during the fast transient engine operation based when the fast transient NOx estimate is greater than the fast transient NOx threshold.

2. The method of claim 1, wherein controlling the engine system comprises:
comparing the fast transient NOx estimate to a fast transient NOx threshold calibrated based upon the closing of the exhaust gas recirculation valve and a rate of increase of a fuel air ratio of the engine exceeding a threshold rate of increase of the fuel air ratio of the engine; and
controlling the engine system in the vehicle during the fast transient engine operation based when the fast transient NOx estimate is greater than the fast transient NOx threshold.

3. Method for controlling an internal combustion engine, the method comprising:
monitoring engine operation comprising a parameter descriptive of NOx generation within the engine;
determining a fast transient NOx estimate with a dynamic model based upon the monitored engine operation; and
during a fast transient engine operation comprising an increase in an operating state of the engine and a substantial closing of an exhaust gas recirculation valve, controlling an engine system based upon the fast transient NOx estimate;
wherein monitoring engine operation comprising the parameter descriptive of NOx generation within the engine comprises monitoring a measurement of the parameter, the method further comprising:
determining a reference command of the parameter;
determining an error of the parameter based upon a difference of the measurement of the parameter and the reference command of the parameter; and
wherein controlling the engine system during the fast transient engine operation comprises:
comparing the error of the parameter to a threshold error of the parameter; and
controlling the system in the vehicle during the fast transient engine operation based upon an absolute value of the error of the parameter being greater than the threshold error of the parameter.

4. Method for controlling an internal combustion engine, the method comprising:
monitoring engine operation comprising a parameter descriptive of NOx generation within the engine;
determining a fast transient NOx estimate with a dynamic model based upon the monitored engine operation; and
during a fast transient engine operation comprising an increase in an operating state of the engine and a substantial closing of an exhaust gas recirculation valve, controlling an engine system based upon the fast transient NOx estimate;

wherein controlling the engine system during the fast transient engine operation is based upon estimating the substantial closing of the exhaust gas recirculation valve during the increase in the operating state of the engine;

wherein monitoring the engine operation further comprises monitoring the operating state of the engine comprising an engine speed and an engine load; and wherein estimating the substantial closing of the exhaust gas recirculation valve during the increase in the operating state of the engine comprises:
- monitoring the increase in the operating state of the engine based upon the monitored engine operation;
- determining an expected fuel air ratio based upon the engine speed and the engine load;
- monitoring a measured fuel air ratio;
- comparing the expected fuel air ratio to the measured fuel air ratio; and
- determining the substantial closing of the exhaust gas recirculation valve during the increase in the operating state of the engine based upon the measured fuel air ratio being greater than the expected fuel air ratio by more than a predetermined amount.

5. The method of claim 1, wherein monitoring engine operation further comprises monitoring parameters descriptive of NOx generation within the engine during a steady state engine operation comprising an engine operation that is not a fast transient engine operation, the method further comprising:
- determining a steady state NOx estimate based upon the monitored engine operation; and
- wherein controlling the system during the fast transient engine operation is further based upon the steady state NOx estimate.

6. The method of claim 5, wherein the dynamic model comprises a nonlinear dynamic model in discrete state space, and wherein the steady state NOx estimate utilizes an artificial neural network.

7. The method of claim 5, wherein determining the steady state NOx estimate comprises utilizing a nonlinear regression model.

8. The method of claim 1, wherein monitoring engine operation comprising the parameter descriptive of NOx generation within the engine comprises monitoring an exhaust gas recirculation rate.

9. The method of claim 1, wherein monitoring engine operation comprising the parameter descriptive of NOx generation within the engine comprises monitoring an intake air flow rate.

10. Method for controlling an internal combustion engine, the method comprising:
- monitoring engine operation including parameters descriptive of combustion within the engine;
- determining a steady state NOx estimate with an artificial neural network based upon the monitored engine operation;
- determining a fast transient NOx estimate with a dynamic model based upon the monitored engine operation;
- during a fast transient engine operation comprising an increase in an operating state of the engine and a substantial closing of an exhaust gas recirculation valve, determining an engine out NOx estimate based upon the steady state NOx estimate and the fast transient NOx estimate; and
- controlling operation of a system within the vehicle based upon the engine out NOx estimate;
- wherein the parameters descriptive of combustion within the engine comprise an intake air flow into the engine and an exhaust gas recirculation flow into the engine; and
- wherein determining the fast transient NOx estimate based upon the monitored engine operation comprises determining the fast transient NOx estimate based upon an intake air flow error describing a difference between an intake air flow reference command and a measured intake air flow and an exhaust gas recirculation error describing a difference between an exhaust gas recirculation reference command and a measured exhaust gas recirculation.

11. The method of claim 10, wherein the dynamic model is a nonlinear transient dynamic model in discrete state space comprising matrices determined based upon experimental operation of a test engine.

12. The method of claim 10, wherein determining the fast transient NOx estimate based upon the monitored engine operation further comprises determining the fast transient NOx estimate further based upon a square of the intake air flow error and a square of the exhaust gas recirculation error.

13. The method of claim 10, wherein the exhaust gas recirculation reference command is calculated based upon an engine speed and a fuel flow into the engine.

14. The method of claim 10, wherein determining the fast transient NOx estimate based upon the monitored engine operation further comprises:
- comparing an absolute value of the intake air flow error to a threshold error of the intake air flow;
- neglecting the intake air flow error if the absolute value of the intake air flow error is less than the threshold error of the intake air flow;
- comparing an absolute value of the exhaust gas recirculation error to a threshold error of the exhaust gas recirculation; and
- neglecting the exhaust gas recirculation error if the absolute value of the exhaust gas recirculation error is less than the threshold error of the exhaust gas recirculation.

15. The method of claim 10, wherein the parameters descriptive of combustion within the engine comprise an exhaust gas recirculation flow into the engine and a parameter selected from the group consisting of an engine air fuel ratio, an intake oxygen percentage, a fuel flow into the engine, an engine output torque, an intake manifold temperature, and a start of injection timing.

16. The method of claim 10, wherein the parameters descriptive of combustion within the engine comprise an exhaust gas recirculation flow into the engine, an engine air fuel ratio, a fuel flow into the engine, a start of injection timing, and an intake manifold temperature.

17. The method of claim 10, wherein controlling operation of the engine system based upon the engine out NOx estimate comprises controlling regeneration of a lean NOx trap.

18. The method of claim 10, wherein controlling operation of the engine system based upon the engine out NOx estimate comprises controlling urea dosing to a selective catalytic reduction device.

* * * * *